United States Patent Office 3,564,952
Patented Feb. 23, 1971

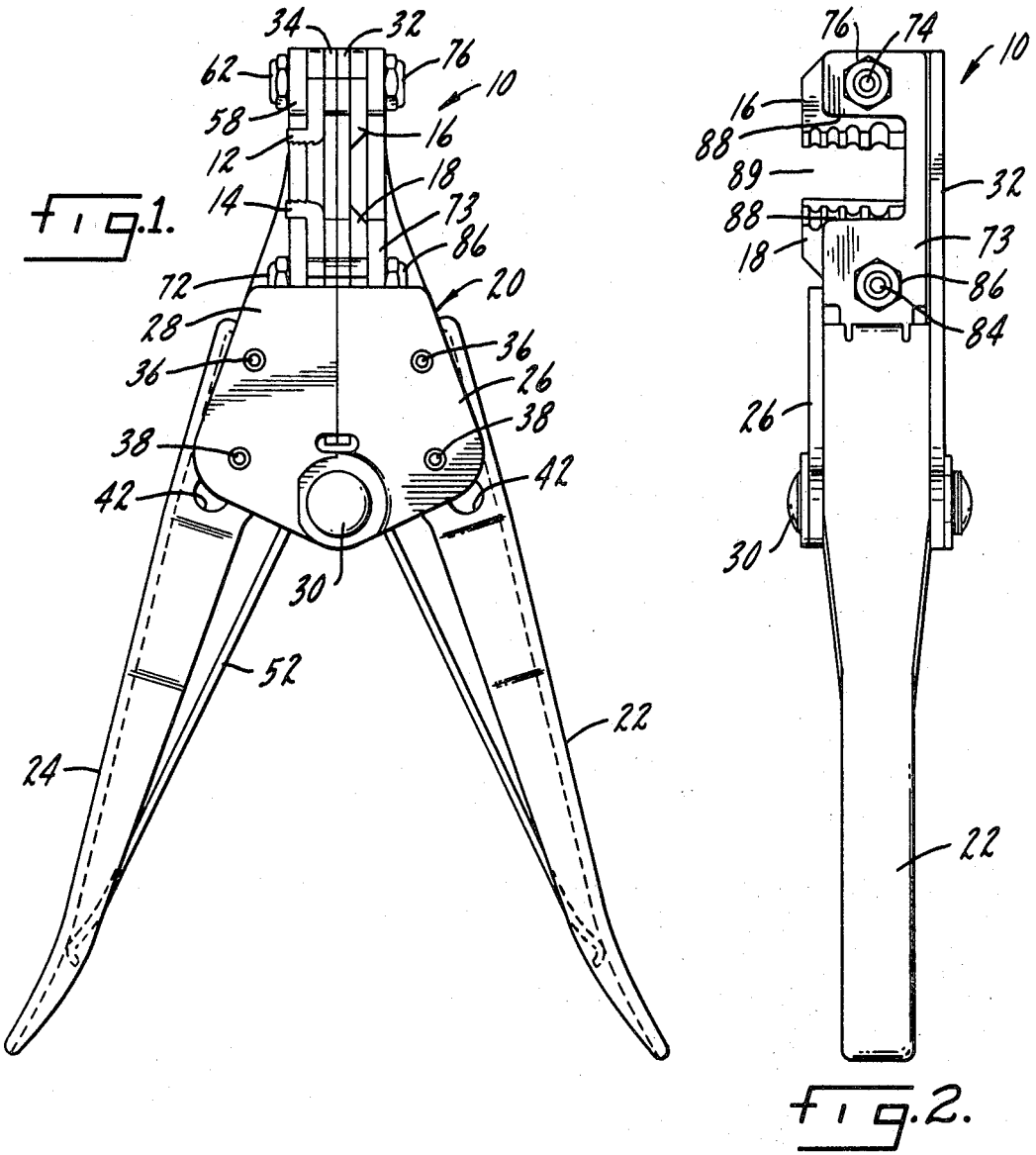

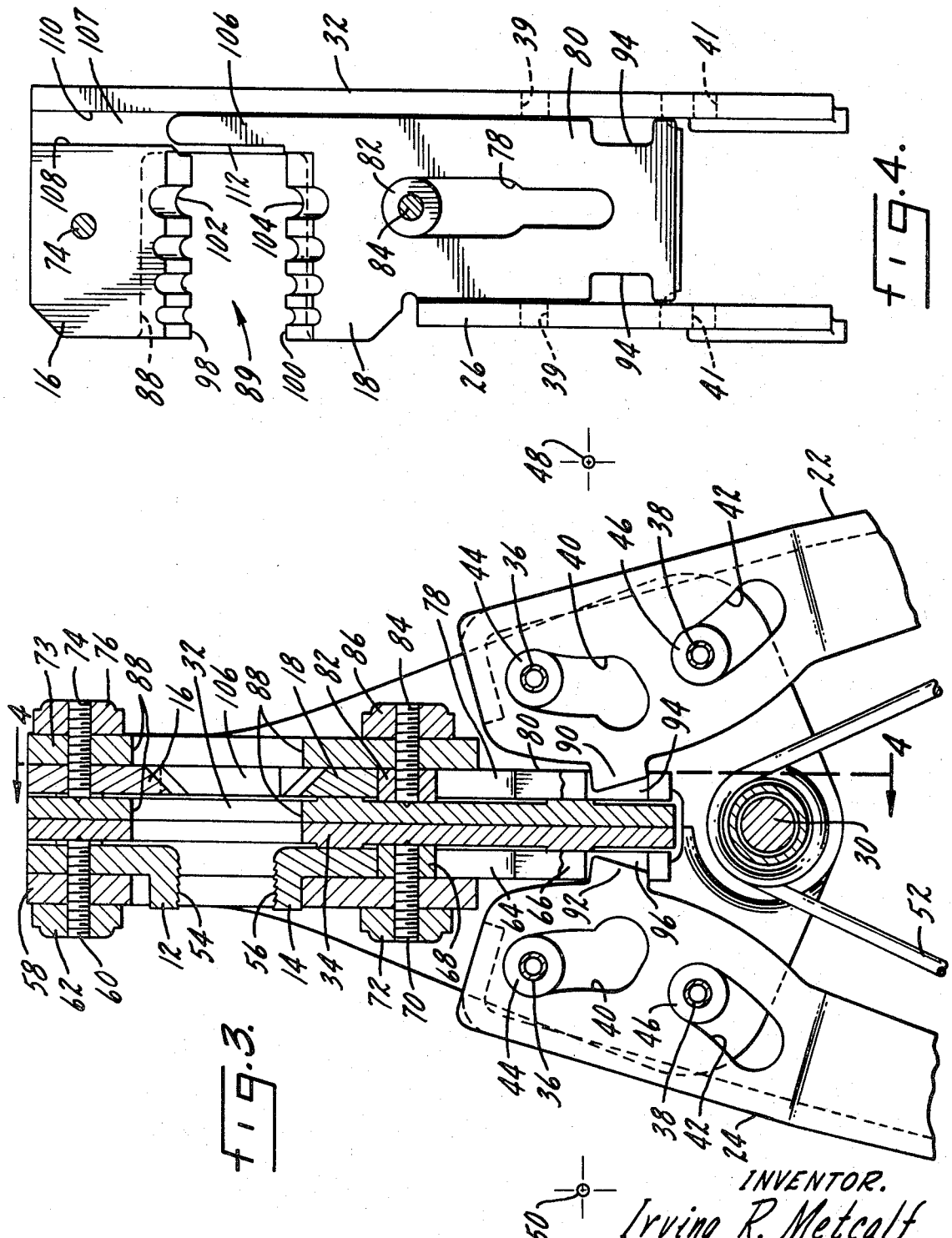

1

3,564,952
WIRE STRIPPER
Irving R. Metcalf, St. Charles, Ill., assignor to Ideal Industries, Inc., Sycamore, Ill., a corporation of Delaware
Filed July 22, 1968, Ser. No. 746,635
Int. Cl. H02g 1/12
U.S. Cl. 81—9.5
8 Claims

ABSTRACT OF THE DISCLOSURE

A wire stripper device having a pair of blades movable to cut and then strip insulation from wires. A guiding device formed on one of the blades functions to assure alignment of the teeth or cutting channels so that the wires are not damaged or nicked.

SUMMARY OF THE INVENTION

This invention relates to devices for stripping insulation from wiring and more particularly relates to wire stripper tools such as the hand operated strippers used in removing insulation from wire ends.

Previous wire strippers of the type described incorporate various types of insulation cutting and stripping blades. A problem encountered with these prior strippers is that any misalignment of the blades will cause uneven cutting, nicking or other damage to the wire as the blades move together. It is recognized that the electrical properties, strength and performance of the resulting connection made with wire ends damaged in this manner are adversely affected by this damage.

Previous attempts to provide blade alignment have either not been entirely successful or have resulted in a construction which is too complicated and expensive. Strippers which provide a center tongue and groove arrangement such as shown in Pat. No. 2,179,581 or the leg and channel arrangement of Pat. No. 2,523,936 introduced manufacturing problems in which the blades must be carefully ground and finished in an expensive grinding operation. Other types of strippers which utilize a series of teeth on one blade to interlock or register with aligning slots on the other blade are undesirable in that by the time alignment is effected the damage has already been done since a cocked blade may nick the wire before moving into its interlocked relationship.

Accordingly, it is an object of this invention to provide a wire stripper device having movable cutting and stripping blades with means to effectively provide alignment of the blades throughout full blade movement.

Another object is to provide a wire stripper of the type described in which an aligning tongue on one blade interfits in sliding engagement between the stripper frame and other blade to provide automatic alignment throughout the full range of blade travel.

Another important object is to provide an automatic guiding arrangement for stripper blades in which the blades may be manufactured inexpensively in one set-up for the grinding operation.

Another object is to provide a wire stripper device having a cutting and stripping blade arrangement in which means are provided to guide the movable blade in exact alignment with the stationary blade throughout full blade travel so that damage to the wire is obviated.

2

These and other objects and advantages of the invention will become apparent to those skilled in the art when the following specification is read in conjunction with the accompanying drawings.

DESCRIPTION OF THE DRAWINGS

FIG. 1 is a front view of a wire stripper device incorporating features of the invention;
FIG. 2 is a side view of the wire stripper of FIG. 1;
FIG. 3 is an enlarged front view, partially sectioned, of the wire stripper;
FIG. 4 is an enlarged view of component elements of the wire stripper.

DETAILED DESCRIPTION

Referring now to the drawings, and particularly FIGS. 1 and 2, a device for stripping insulation from wire is indicated generally at 10.

Stripper 10 comprises pairs of wire gripping blades 12, 14 and wire stripping blades 16, 18 mounted on a handcarried frame indicated generally at 20. A pair of operating handles 22, 24 are manipulated by the operator to actuate each pair of gripping and stripping blades in opening and closing operations for stripping wire ends. It is contemplated that the stripper may also be bench mounted, and may be operated by other means such as electrical power.

Frame 20 may comprise a pair of oppositely facing U-shaped frame sections 26, 28 pivoted together at their lower end by pivot pin 30. Each frame section may be formed with an upwardly extending integral frame web 32, 34 for mounting respective pairs of stripping and gripping blades.

The handles 22 and 24 may be formed into a U-shaped cross-section by a simple stamping operation. Each handle is mounted between the side legs of a respective frame section 26, 28 by means of pairs of pins 36, 38 positioned in respective mounting holes 39, 41 of the legs. As best seen in FIG. 3 the mounting arrangement may comprise pairs of arcuate slots 40, 42 formed in the handle side legs for engagement with respective pairs of rollers 44, 46 rotatably mounted on the pins. This mounting arrangement provides rotation of the handles with respect to the frame sections on an arc about the phantom centers 48, 50. A return spring 52 mounted about pin 30 urges the handles and frame sections to the position illustrated for insertion of the wire to be stripped.

Referring to FIGS. 3 and 4, details of the gripping and stripping blade arrangements are shown in greater detail. In the preferred embodiment the lower gripping blade 14 and stripping blade 18 are mounted for movement to and from the fixed upper blades 12 and 16, although it could be reversed.

The gripping blades 12 and 14 are L-shaped in cross-section and are formed with knurled, serrated or grooved facing surfaces 54, 56 to provide effective engagement with the insulated wire surface. The upper gripping blade 12 is fixedly mounted to frame web 34 by suitable means such as backing plate 58, stud 60, and holding nut 62. The lower gripping blade 14 is mounted for slidable movement with respect to frame web 34 through means of a slot 64 formed in lower blade extension 66. Slot 64 is guided for vertical movement around a spacer 68 secured to web 34 by means of plate 58, stud 70, and nut 72.

The stripping blades are mounted to frame web 32 in a similar manner. Upper blade 16 is fixedly secured to the web by means of backing plate 73, stud 74, and nut 76. A slot 78 in lower extension 80 of blade 18 is slidably mounted around spacer 82 secured to web 32 by means of plate 73, stud 84, and nut 86. All of the frame webs and backing plates are provided with aligned cut-away portions 88 defining an opening or enlarged slot 89 for receiving the wire between the blades.

Pairs of inwardly extending camming projections 90, 92 on respective side legs of the handles interfit with slots 94, 96 formed in blade extensions 80 and 66. This interfitting relationship will operate the stripping and gripping blades vertically as the handles are closed and opened.

Both of the stripping blades 16 and 18 are ground with respective cuttings edges 98, 100 having inwardly sloping surfaces, as viewed in FIG. 3. A plurality of cutting channels 102, 104 are formed in the cutting edges. The channels may be dimensioned with different radii to conform generally to various wire sizes.

As movable blade 18 moves to fixed blade 16 it is important that the opposing cutting edges and channels remain in exact alignment. If they are misaligned, as where the movable blade is cocked for any reason, the blades may nick or damage the wire conductor. Cocking of the movable blade may occur if one of the handle projections such as 90 hits the leading edge of blade slot 94 ahead of the other projection.

To eliminate this the invention provides a guide member or tongue 106 preferably formed integral with movable blade 18. The invention also contemplates that tongue 106 may be a separate piece secured to the blade, or may be integral or secured to fixed blade 16.

A guide slot 107 is formed between upper blade edge 108 and inner edge 110 of frame web 32. To provide exact alignment at all times, edge 108 is formed normal to unpper cutting edge 98 while tongue edge 112 is formed normal to lower cutting edge 100. With tongue edge 112 moving within slot 107 in guiding or sliding relationship with blade edge 108 throughout substantially the full range of blade travel, parallel movement of the two blade edges is insured. Thus, even if one of the projections 90, 92 hits the blade slot ahead of the other, the guiding tongue arrangement will automatically prevent blade cocking and misalignment. The chance of nicking or damaging the wire is therefore greatly reduced. Moreover, blade manufacturing is simplified into an inexpensive grinding operation since only a single grinding set-up is required for grinding both of the blades and the guide tongue.

The functioning and operation of the wire stripper will now be described. The insulated wire end is first inserted through opening 89 between the gripping and stripping blades in registry between the proper blade cutting channels. Handles 22 and 24 are then manipulated to first slide movable gripping blade 14 and stripping blade 18 upwardly. The wire is securely gripped by this operation between the knurled faces of the gripping blades. As stripping blade 18 moves upwardly, it is guided in alignment with the upper blade by tongue 106 so that its leading edge is not cocked relative to the edge of the upper blade. As the blades move together they will cut through the insulation surrounding the wire while the wire conductor is nestled within the channels. After blade movement stops, further closing of the handles will start to pivot the frame sections 26, 28 apart. During this pivotal action, stripping blades 16 and 18 will strip the insulation from the wire end as the proximal wire portion is held by the gripping blade. Following this, pressure on the handles is released so that the action of return spring 52 operates to pivot the handles back, move the stripping and gripping blads apart for release of the wire, and then pivot the frame sections to the position of FIG. 1. The wire stripper is now ready for another stripping operation.

While the embodiment herein is at present considered to be preferred it is understood that numerous variations and modifications may be made by those skilled in the art and it is intended to cover in the appended claims all such variations and modifications as fall within the true spirit and scope of the invention.

I claim:

1. A device for stripping insulation from wire comprising the combination of means for gripping the wire, a pair of stripping blades, at least one blade movable to and from the other blade for cutting insulation on wire held by the gripping means, frame means for mounting the gripping means and blade means in wire receiving relationship, operating means to actuate the gripping means and move the one blade to the other blade for cutting the insulation, said operating means further moving the pair of blade means from the gripping means to strip said insulation from the wire, a guide tongue constrained for movement with one of said blades and being in guiding relationship with the other of said blades during said blade movement to maintain a predetermined alignment between said blades, the one blade being formed with a cutting edge, the guide tongue being secured to said one blade and formed with a guiding surface normal to the edge, said other blade being formed with a cutting edge and a guiding surface normal to the edge, and said tongue and guide surfaces moving in guiding relationship.

2. The invention of claim 1 wherein the guiding surfaces move in said guiding relationship throughout substantially full blade travel.

3. A device for stripping insulation from wire comprising the combination of means for gripping the wire, a pair of stripping blades, at least one blade movable to and from the other blade for cutting insulation on wire held by the gripping means, frame means for mounting the gripping means and blade means in wire receiving relationship, operating means to actuate the gripping means and move the one blade to the other blade for cutting the insulation, said operating means further moving the pair of blade means from the gripping means to strip said insulation from the wire, a guide tongue constrained for movement with one of said blades and being in guiding relationship with the other of said blades during said blade movement to maintain a predetermined alignment between said blades, said other blade including a cutting edge and a guiding edge normal to the edge and spaced from the frame to define a guide slot therewith, and said guide tongue being constrained for movement within said guide slot.

4. A wire stripper device comprising the combination of: a pair of frame sections mounted together for pivotal movement; a pair of gripping members mounted on one of said frame sections; first operating means to move the members together for gripping a wire; a pair of stripping blades mounted on said other frame section; second operating means to move at least one blade to and from the other blade to cut insulation from wire gripped by said members; said blades having facing sides formed with substantially parallel cutting edges, one of said blades being formed with a guide edge substantially normal to its cutting edge, said other blade being provided with a guide tongue constrained for movement therewith, said guide tongue having a guide edge substantially normal to the cutting edge of said other blade and being adapted to move in guiding relationship with said guide edge of the other blade during movement of the blades; and, said first and second operating means pivoting said frame sections apart for stripping insulation from the wire.

5. The invention of claim 4 and further characterized in that said one stripping blade is anchored fixedly to said other frame section and said mating stripping blade is mounted on said frame for movement to and from the fixedly anchored blade.

6. The invention of claim 4 and further characterized in that the guide tongue is formed integral with said other blade.

7. The invention of claim 4 and further characterized in that said guide edge of said one blade defines a slot with an edge of said frame section, said slot being aligned substantially normal to the cutting edge of said one blade; and said guide tongue being adapted to move in guiding relationship within said slot.

8. The invention of claim 4 wherein the guide tongue moves in guiding relationship with said guide edge throughout the full range of blade travel.

References Cited

UNITED STATES PATENTS

| | | | |
|---|---|---|---|
| 3,125,909 | 3/1964 | Hindenburg | 81—9.5 |
| 3,311,001 | 3/1967 | Gallagher et al. | 81—9.5 |

TRAVIS S. McGEHEE, Primary Examiner